United States Patent [19]
Bucher et al.

[11] Patent Number: 5,671,376
[45] Date of Patent: Sep. 23, 1997

[54] UNIVERSAL SCSI ELECTRICAL INTERFACE SYSTEM

[75] Inventors: Steven Bucher, Minnetonka; Wayne A. Kosters, Eden Prairie, both of Minn.

[73] Assignee: I-Tech Corporation, Edina, Minn.

[21] Appl. No.: 646,080

[22] Filed: May 7, 1996

Related U.S. Application Data

[63] Continuation of Ser. No. 67,473, May 24, 1993.
[51] Int. Cl.$^6$ .................................................. G06F 13/14
[52] U.S. Cl. .............................. 395/309; 395/285; 370/27
[58] Field of Search ....................... 340/825.5; 370/85.1, 370/27; 395/500, 309, 285

[56] References Cited

U.S. PATENT DOCUMENTS

| | | |
|---|---|---|
| 3,333,113 | 7/1967 | Cole et al. . |
| 4,393,494 | 7/1983 | Belforte et al. .......................... 370/284 |
| 4,825,402 | 4/1989 | Jalaci ...................................... 395/500 |
| 4,864,291 | 9/1989 | Korpe ..................................... 340/825.5 |
| 5,206,946 | 4/1993 | Brunk ..................................... 395/500 |
| 5,243,623 | 9/1993 | Murdock ................................. 375/220 |
| 5,264,958 | 11/1993 | Johnson .................................. 395/309 |

OTHER PUBLICATIONS

Publication: Jan. 4, 1993 Working Draft of the SCSI-3 Parallel Interface, (ANS X3T9.2/91–010R7).

Primary Examiner—Ayaz R. Sheikh
Assistant Examiner—Paul R. Myers
Attorney, Agent, or Firm—Patterson & Keough, P.A.

[57] ABSTRACT

A universal electrical interface system connects to a small computer system interface (SCSI) bus. In a passive embodiment, a set of single-ended receivers and a set of differential receivers receive electrical signals on the SCSI bus according to the single-ended or differential protocol, respectively, when each set of receivers is enabled. In an active embodiment, a set of single-ended transceivers and a set of differential transceivers transmit and receive electrical signals on the SCSI bus according to the single-ended or differential protocol, respectively, when each set of transceivers is enabled. A control mechanism connected to both sets of receivers or transceivers automatically determines whether the SCSI bus is configured to use either the single-ended or differential parallel interface protocol and selectively enables the set of single ended receivers or transceivers, or the set of differential receivers or transceivers. The receivers and transceivers present an appropriate set of TTL signals to a SCSI device that have values which correspond to the proper value of the electrical signals on the SCSI bus, regardless of whether the SCSI bus is configured to use the single-ended protocol or the differential protocol. In a preferred embodiment, a single universal SCSI connector detachably connects to and receives and/or transmits electrical signals from a SCSI bus configured to use either the single-ended or differential parallel interface protocols.

14 Claims, 9 Drawing Sheets

| pin | transceiver connections | | pin | transceiver connections | |
|---|---|---|---|---|---|
| 1 | S_GND01 | +D_DB12 | 35 | -S_DB12 | -D_DB12 |
| 2 | S_GND02 | +D_DB13 | 36 | -S_DB13 | -D_DB13 |
| 3 | S_GND03 | +D_DB14 | 37 | -S_DB14 | -D_DB14 |
| 4 | S_GND04 | +D_DB15 | 38 | -S_DB15 | -D_DB15 |
| 5 | S_GND05 | +D_DBP1 | 39 | -S_DBP1 | -D_DBP1 |
| 6 | GROUND | | 40 | -S_DB00 | D_GND40 |
| 7 | S_GND07 | +D_DB14 | 41 | -S_DB01 | -D_DB00 |
| 8 | S_GND08 | +D_DB15 | 42 | -S_DB02 | -D_DB01 |
| 9 | S_GND09 | +D_DB02 | 43 | -S_DB03 | -D_DB02 |
| 10 | S_GND10 | +D_DB03 | 44 | -S_DB04 | -D_DB03 |
| 11 | S_GND11 | +D_DB04 | 45 | -S_DB05 | -D_DB04 |
| 12 | S_GND12 | +D_DB05 | 46 | -S_DB06 | -D_DB05 |
| 13 | S_GND13 | +D_DB06 | 47 | -S_DB07 | -D_DB06 |
| 14 | S_GND14 | +D_DB07 | 48 | -S_DBP | -D_DB07 |
| 15 | S_GND15 | +D_DBP | 49 | S_GND49 | -D_DBP |
| 16 | DIFFSENS | | 50 | GROUND | |
| 17 | (TERMPWR) | | 51 | (TERMPWR) | |
| 18 | (TERMPWR) | | 52 | (TERMPWR) | |
| 19 | (RESERVED) | | 53 | (RESERVED) | |
| 20 | S_GND20 | +D_ATN | 54 | S_GND54 | -D_ATN |
| 21 | GROUND | | 55 | -S_ATN | D_GND55 |
| 22 | S_GND22 | +D_BSY | 56 | S_GND56 | -D_BSY |
| 23 | S_GND23 | +D_ACK | 57 | -S_BSY | -D_ACK |
| 24 | S_GND24 | +D_RST | 58 | -S_ACK | -D_RST |
| 25 | S_GND25 | +D_MSG | 59 | -S_RST | -D_MSG |
| 26 | S_GND26 | +D_SEL | 60 | -S_MSG | -D_SEL |
| 27 | S_GND26 | +D_C/D | 61 | -S_SEL | -D_C/D |
| 28 | S_GND28 | +D_REQ | 62 | -S_C/D | -D_REQ |
| 29 | S_GND29 | +D_I/O | 63 | -S_REQ | -D_I/O |
| 30 | GROUND | | 64 | -S_I/O | D_GND64 |
| 31 | S_GND31 | +D_DB08 | 65 | -S_DB08 | -D_DB08 |
| 32 | S_GND32 | +D_DB09 | 66 | -S_DB09 | -D_DB09 |
| 33 | S_GND33 | +D_DB10 | 67 | -S_DB10 | -D_DB10 |
| 34 | S_GND34 | +D_DB11 | 68 | -S_DB11 | -D_DB11 |

FIG. 4

UNIVERSAL SCSI ELECTRICAL INTERFACE SYSTEM

This is a Continuation of application Ser. No. 08/067,473 filed May 24, 1993.

TECHNICAL FIELD

The present invention relates generally to connectors and transceivers for interconnecting pieces of computer equipment. More particularly, the present invention relates to a universal small computer systems interface (SCSI) electrical interface system.

BACKGROUND ART

The small computer systems interface (SCSI) is a well known, standard bus parallel interface standard that defines two separate electrical interface protocols: single-ended and differential. When a SCSI bus is configured according to the single-ended protocol, electrical signals on the SCSI bus are defined as a single transmission line such that a signal is active if the voltage measured on that line is less than 0.8 Volts with respect to ground and is inactive if the voltage is greater than 2.0 Volts with respect to ground. When a SCSI bus is configured according to the differential protocol, electrical signals on the SCSI bus are defined as a pair of transmission lines such that an active signal is positive if the voltage difference measured across the pair of lines is greater than about 0.2 Volts and is negative of the voltage difference measured across the pair of lines is less than about −0.2 Volts. For a more detailed explanation of the relevant SCSI protocols, reference is made to the Jan. 4, 1993 Working Draft of the SCSI-3 Parallel Interface, (ANS X3T9.2/91-010R7), the disclosure of which is hereby incorporated by reference.

The advantage of having both types of electrical interface protocols is that the SCSI bus can be easily adapted to operate in a wide variety of electrical environments. For example, in situations where there is expected to be significant electrical interference across the SCSI bus, the differential protocol provides for transmission and reception of more accurate signal levels. Conversely, if the parameters of the operating environment are known, the ability to use the single-ended protocol can decrease the total number of, and the complexity of, connections required to implement an electrical connection to a SCSI bus. As contemplated by the SCSI-3 Parallel Interface standard, however, the single-ended and differential protocol alternatives are mutually exclusive (ANS X3T9.21/91-010R7), Jan. 4, 1993 Working Draft, Section 7, pp. 18.

The disadvantage of having a bus interface protocol that defines two separate electrical interface protocols is that it is necessary to determine which electrical interface protocol is being used before the signals on the SCSI bus can be properly received. In the case of pieces of computer equipment that are designed to operate together, the designer knows which electrical interface protocol is being used and can use the appropriate set of single-ended or differential transceivers to translate the electrical signals on the SCSI bus to standard transistor transistor level (TTL) voltages, for example. In the case of pieces of computer equipment that have not been designed to operate together, or in the case of diagnostic equipment adapted to operate on a SCSI bus, a preliminary step of determining whether a SCSI bus is configured to use the single-ended or differential protocol is a prerequisite to connecting that piece of equipment to the SCSI bus. In the case of a piece of passive diagnostic equipment, for example, this determination can be accomplished by providing the piece of diagnostic equipment with two different physical SCSI connectors, one connected to a set of single-ended receivers and the other connected to a set of differential receivers. The operator manually determines which electrical interface protocol is being used on the SCSI bus, for example by measuring voltage levels on the SCSI bus, and then connects the appropriate one of the two SCSI connectors to the SCSI bus and indicates to the piece of equipment which of the two connectors to use for receiving signals from the SCSI bus.

Although the existing technique of manually determining which of two different physical SCSI connectors should be connected to a SCSI bus depending upon which electrical interface protocol is being used by the SCSI bus is adequate for connecting a device to a SCSI bus, it would be desirable to provide a universal SCSI connector and transceiver that does not require operator intervention to determine whether a SCSI bus is configured to use the single-ended or differential protocol. In addition, it would simplify the operation and cost of a SCSI connector to provide a universal SCSI connector and transceiver that utilized only a single electrical connector to physically connect to a SCSI bus, regardless of which electrical interface protocol is being used by the SCSI bus.

SUMMARY OF THE INVENTION

The present invention is a universal electrical interface system for connecting to a small computer system interface (SCSI) bus. In a passive embodiment, a set of single-ended receivers and a set of differential receivers receive electrical signals on the SCSI bus according to the single-ended or differential protocol, respectively, when each set of receivers is enabled. In an active embodiment, a set of single-ended transceivers and a set of differential transceivers transmit and receive electrical signals on the SCSI bus according to the single-ended or differential protocol, respectively, when each set of transceivers is enabled. A control mechanism connected to both sets of receivers or transceivers automatically determines whether the SCSI bus is configured to use either the single-ended or differential parallel interface protocol and selectively enables the set of single ended receivers or transceivers, or the set of differential receivers or transceivers. The receivers and transceivers present an appropriate set transistor transistor level (TTL) signals to a SCSI device that have values which correspond to the proper value of the electrical signals on the SCSI bus, regardless of whether the SCSI bus is configured to use the single-ended protocol or the differential protocol. In a preferred embodiment, a single universal SCSI connector detachably connects to and receives and/or transmits electrical signals from a SCSI bus configured to use either the single-ended or differential parallel interface protocols.

In one embodiment of the present invention, the control mechanism consists of a control register that is read by a software program executing in a microprocessor that is part of a SCSI device in which the universal electrical interface system is installed. The input to the control register is connected to a preselected input pin on the SCSI connector. By reading the value in the control register, the software program in the microprocessor can determine whether other devices on the SCSI bus are configured to use the single-ended protocol or the differential protocol. In response, the software program selectively enables the appropriate set of single-ended or differential receivers or transceivers.

In an alternate embodiment of the present invention, the control mechanism consists of circuitry which uses a preselected input pin on the SCSI bus, for example, the DIFF-SENS line, to directly control a set of enable lines on the set of single-ended and differential receivers or transceivers, the set of differential receivers or transceivers having a high active enable line and the set of single-ended receivers or transceivers having a low active enable line. Thus, when the DIFFSENS line is high on the SCSI bus, the control mechanism enables the set of differential receivers or transceivers and disables the set of single-ended receivers or transceivers. Conversely, when the DIFFSENS line is low on the SCSI bus, the control mechanism enables the set of single-ended receivers or transceivers and disables the set of differential receivers or transceivers.

Accordingly, it is a primary objective of the present invention to provide a universal electrical interface system for a SCSI bus that does not require operator intervention to determine whether the SCSI bus is configured to use the single-ended protocol or the differential protocol.

It is another objective of the present invention to provide a universal electrical interface system for a SCSI bus that can utilize only a single electrical connector to physically connect to the SCSI bus, regardless of whether the SCSI bus is configured to use the single-ended protocol or the differential protocol.

It is a further objective of the present invention to provide a universal electrical interface system for a SCSI bus that can reduce the part count and expense of providing electrical interface connections to the SCSI bus, regardless of whether the SCSI bus is configured to use the single-ended protocol or the differential protocol.

These and other objectives of the present invention will become apparent with reference to the drawings, the detailed description of the preferred embodiment and the appended claims.

BRIEF DESCRIPTION OF THE DRAWINGS

FIG. 4 is a complete detailed electrical signal list of the electrical signal connections for a SCSI-3 'P' embodiment of the present invention.

DETAILED DESCRIPTION OF THE PREFERRED EMBODIMENT

Figure 1A:
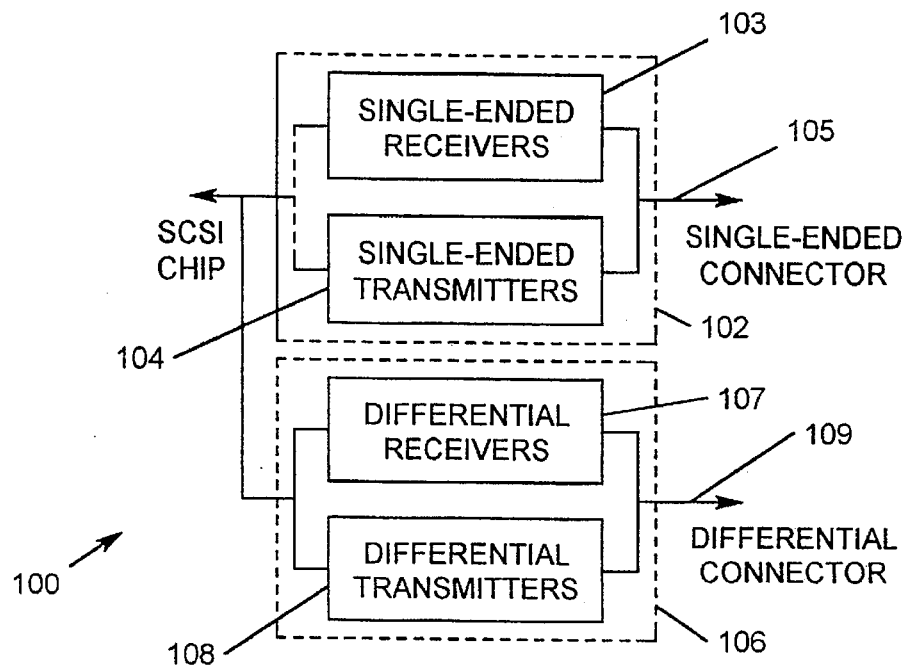
FIGS. 1a and 1b are block diagrams of two SCSI electrical interface systems of the prior art.
Figure 1B:
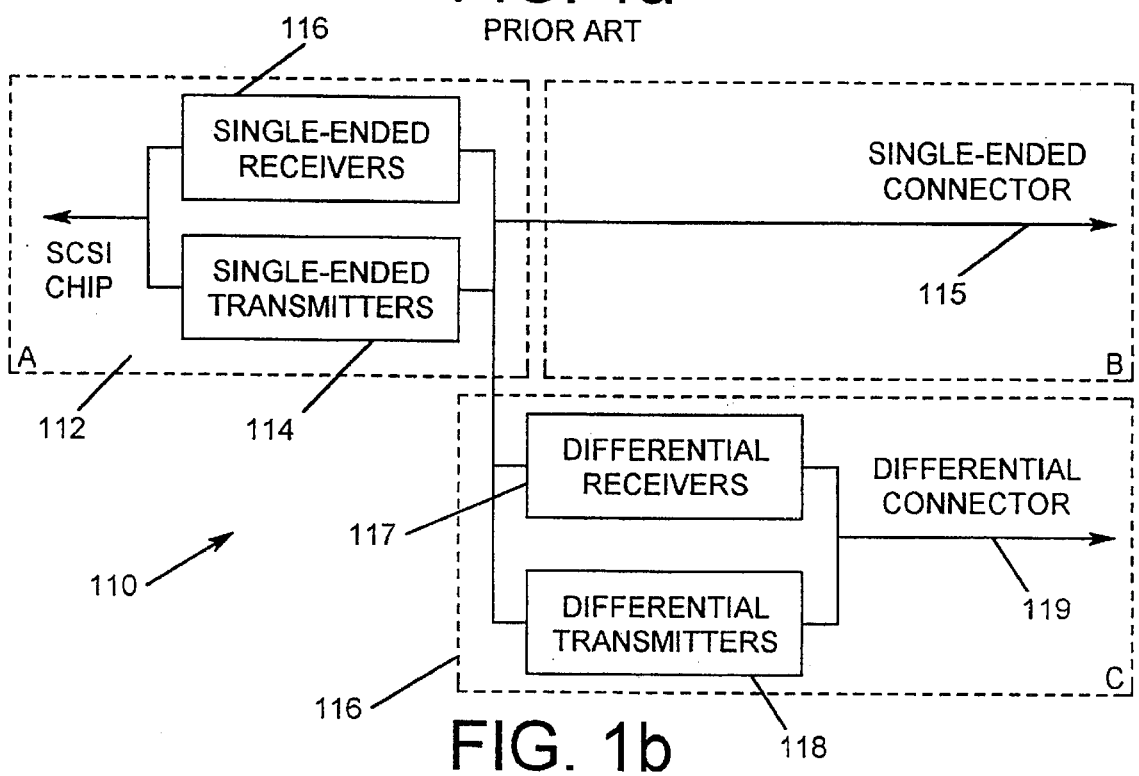
Figure 2:
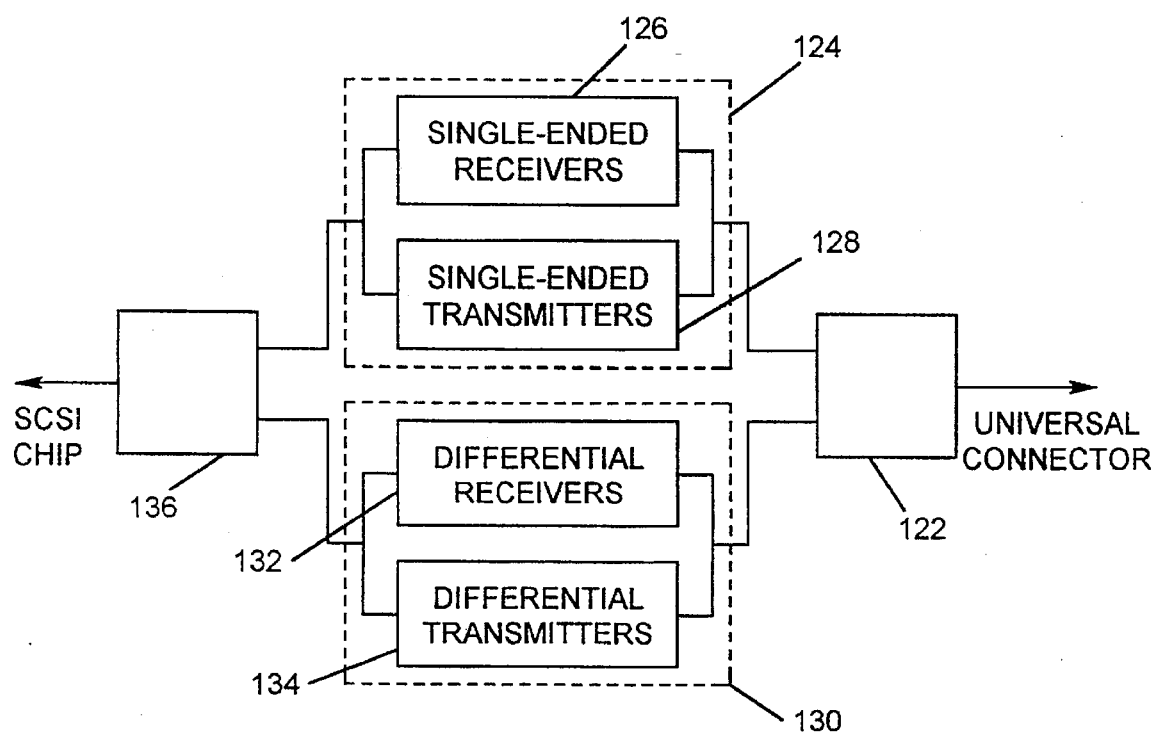
FIG. 2 is an overall block diagram of a preferred embodiment of the SCSI universal electrical interface system of the present invention.

Referring to FIGS. 1a and 1b and FIG. 2, a comparison of the prior art and present invention will be presented.

An older prior art small computer systems interface (SCSI) electrical interface system 100 is shown in FIG. 1a. A set of single-ended transceivers 102, including receivers 103 and transmitters 104, are electrically connected to a single-ended connector 105, and a set of differential transceivers 106, including receivers 107 and transmitters 108, are electrically connected to a differential connector 109. The outputs of the set of single-ended transceivers 102 and the set of differential transceivers 106 are wire ORed together to present a set of bi-directional TTL signals to an older SCSI controller chip (not shown), such as the 33C92 older SCSI controller chip, available from Western Digital Corp., of Irvine, Calif. To connect the dual connector embodiment of the prior art SCSI electrical interface system 100 to a SCSI bus (not shown), an operator must manually determine whether the SCSI bus is configured to use the single-ended protocol or the differential protocol, and then physically connect the corresponding one of the two connectors 105 or 109 to the SCSI bus.

A newer prior art small computer systems interface (SCSI) electrical interface system 110 is shown in FIG. 1b. Most current SCSI controller chips, such as the NCR 53C720 SCSI controller chip available from NCR Corp., of Dayton, Ohio, are provided with an internal set of single-ended transceivers 112, including single-ended receivers 113 and single-ended transmitters 114. For a single-ended protocol design, the set of single-ended transceivers 112 that is internal to the SCSI controller chip is electrically connected to a single-ended connector 115. For a differential protocol design, a set of differential transceiver 116, including differential receivers 117 and differential transmitters 118, is connected on one side to the single-ended transceiver 112 and on the other side to a differential connector 119.

In both prior art electrical interface systems 100 and 110, the SCSI controller chip provides appropriate direction control signals to transceivers 102, 112 and 106, 116. Electrical interface system 100 would be implemented in a SCSI diagnostic device, for example, but is normally not implemented in other SCSI devices as these devices are designed to operate only with a single-ended protocol SCSI bus or a differential protocol SCSI bus. In implementing electrical interface system 110, either single-ended connector 115 would be provided, or the set of differential transceivers 116 and differential connector 119 would be provided, but not both. It will be understood that in a passive interface system 100 or 110, only the set of single-ended receivers 103, 113 and the set of differential receivers 107, 117 are required for each of transceivers 102, 112 and 106, 116.

In contrast to the prior art SCSI electrical interface systems 100 and 110, a universal electrical interface system 120 of the present invention as shown in FIG. 2 multiplexes both sides of the electrical interface system such that only a single connection to both the SCSI bus and the SCSI controller chip is required. In an active embodiment, the outputs of a universal connector 122 are electrically connected to both a set of single-ended transceivers 124 and a set of differential transceivers 130. Transceivers 124 and 130 each include an appropriate set of single-ended or differential receivers 126 and 132, respectively, and an appropriate set of single-ended or differential transmitters 128 and 134, respectively. A control mechanism 136 is connected to a preselected input pin defined on universal connector 122. Control mechanism 136 evaluates the preselected input pin and determines whether the SCSI bus to which universal connector 122 is attached is configured to transmit signals according to the single-ended or differential protocol. In response to this determination, control mechanism 136 selectively enables either transceiver 124 for single-ended protocol or transceiver 130 for differential protocol.

As implemented, universal electrical interface system 120 wire OR's both the single-ended and differential signal set together on both sides of system 120 and then selectively manages the enables for transceivers 124 and 130 to control the protocol for which interface 120 will be configured. Thus, only a single universal electrical connector 122 is required to connect to the SCSI bus, regardless of whether the SCSI bus is configured to use the single-ended or differential protocol. In a preferred embodiment, single universal electrical connector 122 is a 68 pin SCSI-3 connector, available from AMP Devices, Inc. of Harrisburg, Pa.

Figure 3:
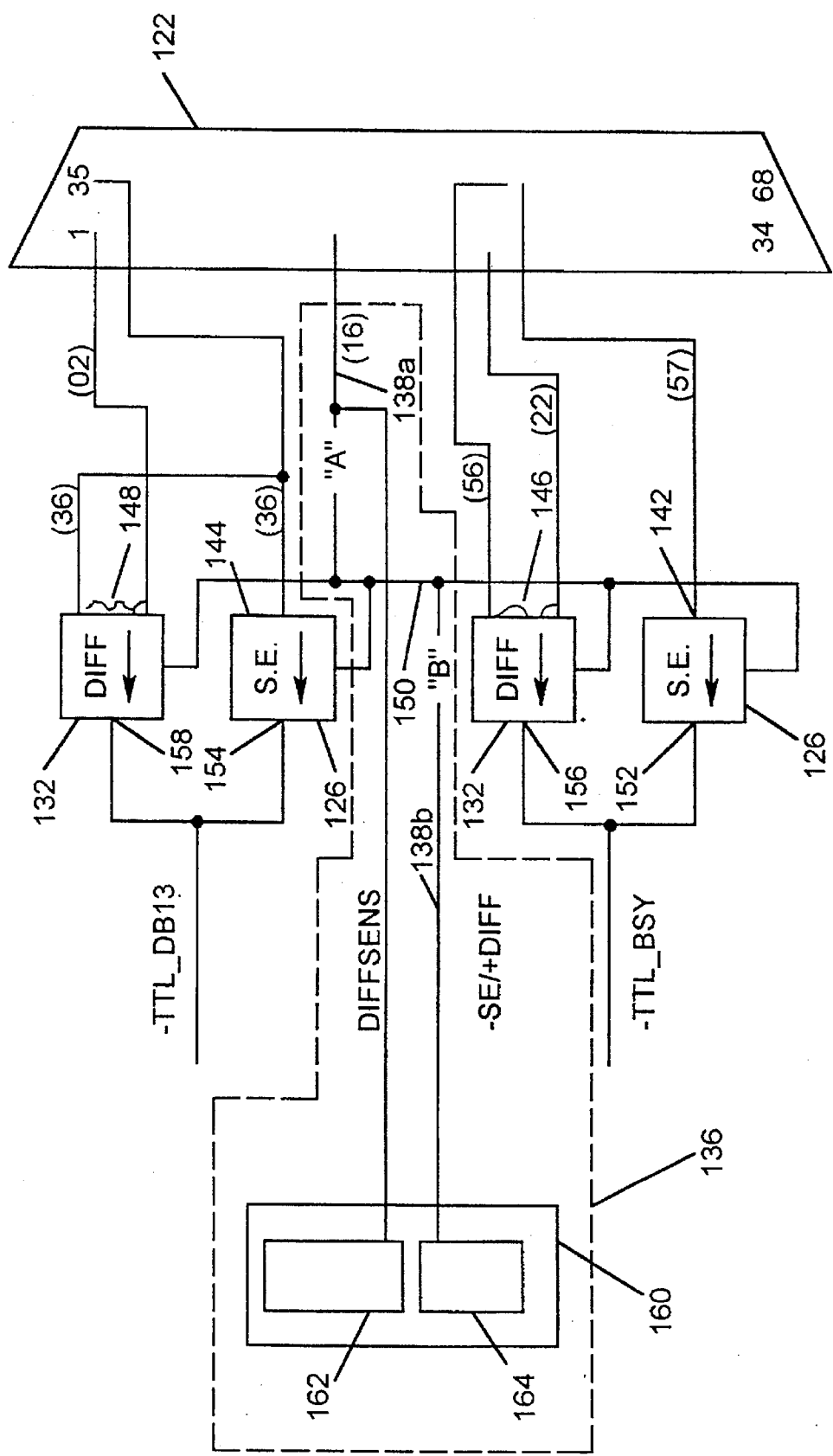
FIG. 3 is a portion of an electrical schematic diagram of showing the implementation of two embodiments of the control mechanism of the present invention.

Referring now to FIG. 3, a more detailed explanation of a preferred embodiment of the interconnection and operation of control mechanism 136 will be described. The receiver portions 126 and 132 of transceivers 124 and 130 are arranged such that the outputs of receivers 126 and 132 can be wire ORed together. In this embodiment, an enable line 150 controls each of the receivers 126 and 132, with differential receivers 132 having a "high active" enable line and single-ended receivers 126 having a "low active" enable line.

Two sample interconnections for the BSY signal and the DB13 signal are shown in FIG. 3. Universal connector 122 has 68 pins, arranged in two rows and numbered as shown. When plugged into a SCSI bus (not shown) that is configured to use the single-ended protocol, the −BSY signal is assigned to pin 57. Thus, pin 57 is connected to a −BSY input 142 of a single-ended receiver 126. Similarly, for the −DB13 signal, it is assigned to pin 36 when the SCSI bus is configured to use the single-ended protocol. Thus, pin 36 is connected to a −DB13 input 144 of a single-ended receiver 126. When plugged into a SCSI bus that is configured to use the differential protocol, the −BSY signal consists of a differential pair of signals +BSY and −BSY, assigned to pins 22 and 56, respectively. Thus, these pins are connected to an input pair 146 of a differential receivers 132. Similarly, the differential signal DB13 consists of a differential pair of signals +DB13 and −DB13 assigned to pins 02 and 36, respectively, that are connected to an input pair 148 of a differential receiver 132.

Because the single-ended electrical interface protocol is low-active, single-ended receiver outputs 152 and 154 are also low active. The standard SCSI differential electrical interface protocol calls for the outputs to be high active. In order to make differential outputs 156 and 158 low active so that they can be multiplexed with low active outputs 152 and 154 of single-ended receivers 126, differential inputs 146 and 148 are reversed from their normal assignment, thereby inverting the corresponding signal logic of differential receivers 132 to match the output of single-ended receivers 126. Single-ended outputs 152 and 154 and differential outputs 156 and 158 are tri-state outputs that are wire OR connected together, with only one of the set of receivers 126 or 132 being enabled by control mechanism 136 at a time.

FIG. 4 shows a complete list of all of the electrical signal connections between SCSI connector 122 for a SCSI-3 'P' cable and the signals connected to the set of transceivers 124 and 130. It will be understood that the signal connections shown in FIG. 4 would be different for a different SCSI cable. Most of the connector pins in SCSI connector 122 connect to two transceiver signals, one for single-ended signals and one for differential signals. In FIG. 4, signal names preceded by "−S__" refer to connections to a single-ended transceiver inputs, such as 142 or 144, while "−D__" and "+D__" refer to a pair of differential transceiver inputs, such as 146 and 148. "S_GNDxx" identifies a signal that is grounded only when the single-ended protocol is selected, and "D_GNDxx" identifies a signal that is grounded only when the differential protocol is selected. These switched grounds should not be connected together at SCSI connector 122, and are given unique numerical suffixes to indicate that each is a separate electrical signal. Signal names listed in parenthesis identify the SCSI-3 'P' cable pin, but do not imply a connection to transceivers 124 and 130.

Two alternate embodiments of control mechanism 136 are shown in FIG. 3. In each of these embodiments, a selected signal from the SCSI bus is used to determine whether the SCSI bus is configured to use the single-ended or differential protocol. In the preferred embodiment, the selected signal is the DIFFSENS line. In a normal SCSI connector arrangement, the DIFFSENS line is used to protect the differential transceivers 106, 116 from damage in the event that a differential connector 109, 119 is inadvertently plugged into a SCSI bus operating in the single-ended protocol, as shown in FIGS. 1a and 1b, respectively. In the SCSI-3 Parallel Interface standard, the DIFFSENS signal is not used for the single-ended protocol and its pin is grounded to indicate a single-ended configuration. (ANS X3T9.21/91-010R7), Jan. 4, 1993 Working Draft, Section 7, pp. 21.

In a first embodiment of control mechanism 136, circuit path 138a is connected while circuit path 138b is left open. Circuit path 138a allows the DIFFSENS line from pin 16 of universal SCSI connector 122 to directly control enable lines 150 to each of the receivers 126 and 132. As indicated above, in this embodiment differential receivers 132 have a "high active" enable line and single-ended receivers 126 have a "low active" enable line. When the DIFFSENS line is high, it enables differential receivers 132 through circuit path 138a, while disabling single-ended receivers 126. When the DIFFSENS line is low, the reverse is true.

In a second embodiment of control mechanism 136, circuit path 138a is left open and circuit path 138b is connected. In this embodiment, the DIFFSENS line from pin 16 of universal connector 122 is connected to an input register 162 or the like, so as to be readable by a programmable controller, such as a microprocessor 160. A signal −SE/+DIFF is connected to enable line 150 and to an output bit in an output register 164 or the like which can be set by microprocessor 160, for example. Microprocessor 160 can read input register 162 to determine via the DIFFSENS line whether the SCSI bus is configured to use the single-ended or differential protocol. Microprocessor 160 can be programmed to follow the DIFFSENS line in setting the −SE/+DIFF signal, or it can override the DIFFSENS line and set the −SE/+DIFF signal to whatever is desired.

In the preferred embodiment of universal SCSI connector 122, pin 16 is handled differently than all of the other connector pins as shown in FIG. 4. The SCSI-3 specification calls for most single-ended pins that do not have signals assigned to be grounded. This includes pin 16, which becomes the DIFFSENS signal when the SCSI bus is configured to use the differential protocol. According to the preferred embodiment of the present invention, pin 16 is used to determine whether the SCSI bus is configured for single-ended or differential operation. Thus, pin 16 is not switched to ground when universal SCSI connector 122 is connected to a SCSI bus configured to use the single-ended protocol. Instead, if any device on the SCSI bus is configured to use the single-ended protocol, that device will ground pin 16, thereby causing control mechanism 136 of the present invention to switch to use the set of single-ended transceivers 124 as shown in FIG. 3. If control mechanism 136 sensed the value on pin 16 and, in response, latched its own ground to pin 16, control mechanism 136 could not revert to using the differential protocol until control mechanism 136 was reset because control mechanism 136 would always read a ground on pin 16 and, consequently, always determine that the SCSI bus was configured for single-ended operation. Accordingly, in the second alternate embodiment shown in FIG. 3, microprocessor 160 periodically checks input register 162 to sense the current value of DIFFSENS pin 16.

Referring now to FIGS. 5a and 5b and FIGS. 6a and 6b, a preferred embodiment of the design of the transceivers 124 and 130 will be described. Presently, most SCSI controller chips have single-ended protocol transceivers 124 that are an internal part of the controller chip, but require external differential transceivers 130 to support operation on a SCSI bus using the differential protocol. In order to control such external differential transceivers 130, special control lines are provided by the SCSI controller chip so that the external differential transceivers 130 can be set to transmit or receive depending upon the SCSI bus activity. For example, a SCSI controller chip, such as the NCR 53C720 chip, available from NCR Corp., Dayton, Ohio, provides a direction signal for every SCSI bit that must be individually controlled, and group direction signals for those SCSI signals whose direction can be controlled as a group.

Figure 5A:
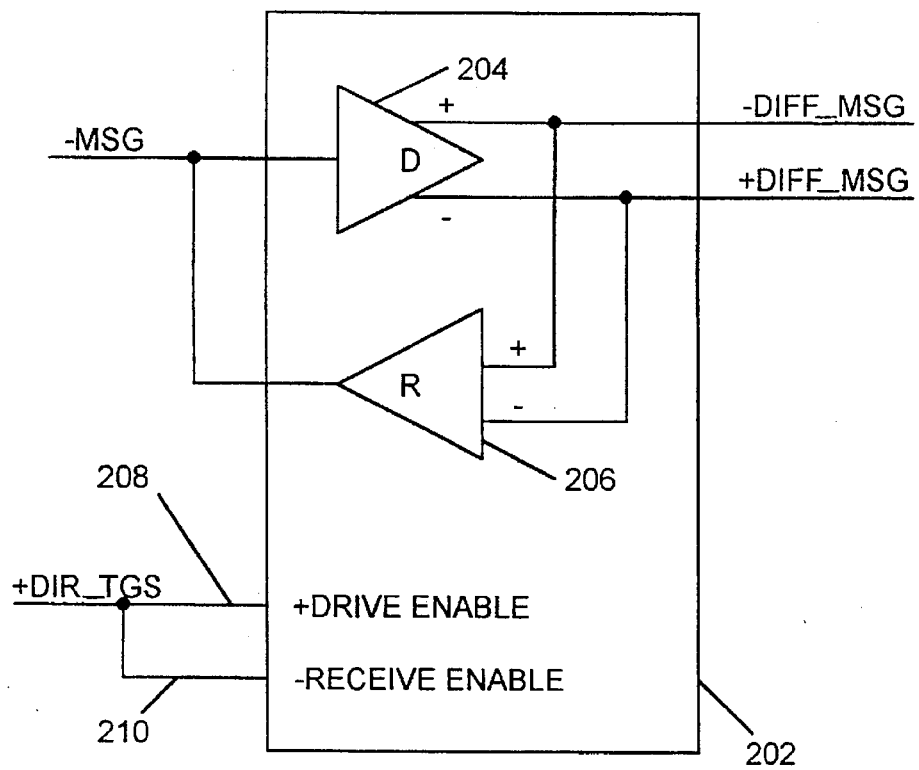
FIGS. 5a and 5b are schematic diagrams of two embodiments of the prior art transceiver configuration for a SCSI-3 'P' differential connector.
Figure 5B:
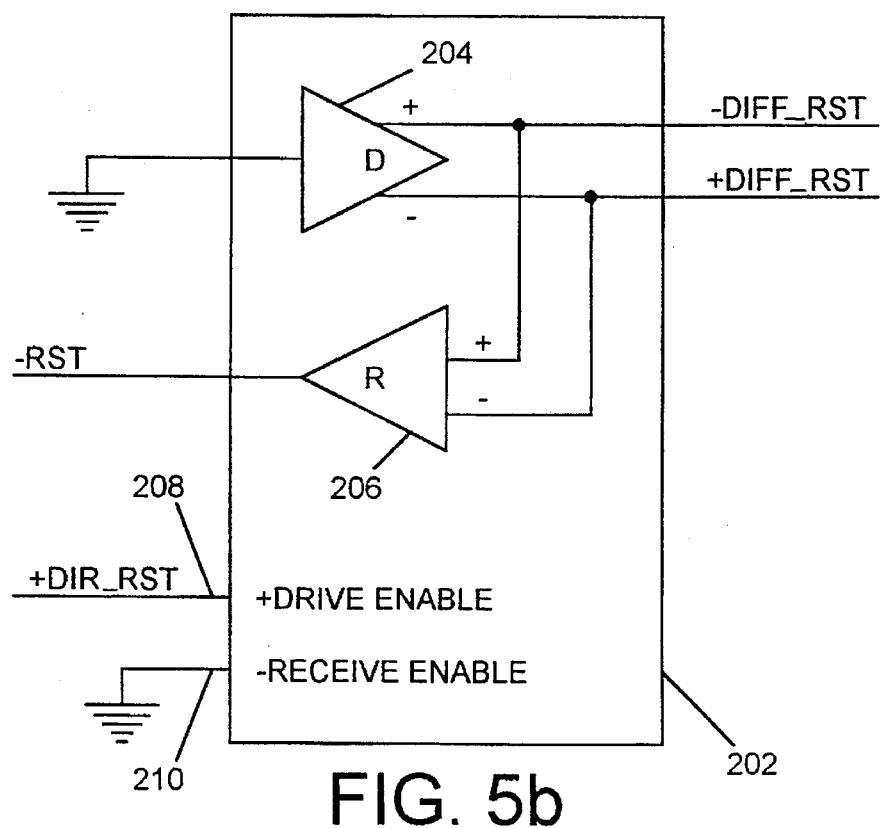

FIGS. 5a and 5b show schematic diagrams of two separate ways in the prior art by which a SCSI controller chip (not shown) is connected to an external transceiver 130. In designing an external differential transceiver connection, it is important to understand that there are two types of signals present on the SCSI bus. Most signals are tri-state, in that they can be driven true, driven false, or not driven at all, e.g., when idle or receiving. The BSY, SEL and RST signals are defined to be OR-tied, meaning that these signals are not to be driven false. Consequently, a slightly different circuit is needed for these signals.

FIG. 5a shows a prior art external differential transceiver design using a SCSI controller chip (not shown) and an external transceiver chip 202, such as a TI 75176, available from Texas Instruments, Inc., Dallas, Tex. Transceiver chip 202 includes a driver portion 204 and a receiver portion 206. The "DIFF" lines are connected to the differential signal connections on a differential connector 119, for example. The "–MSG" and the "+DIR_TGS" lines connect to the SCSI controller chip. The signal "+DIR_TGS" is the direction control signal for the target group of signals (MSG, C/D, I/O, REQ). When "+DIR_TGS" is low, the output of transceiver 202 is tri-stated, and receiver portion 206 is enabled through receiver enable 210. When "+DIR_TGS" is high, transceiver 202 is driving either true or false, depending upon the state of the "–MSG" signal to driver enable 208.

FIG. 5b shows a similar prior art external transceiver design as shown in FIG. 5a, but for the OR-tied signals, such as "–RST". In this case, because the "RST" signal is never to be driven false, the input to driver portion 204 is grounded. In this OR-tied example, the driver portion 204 is enabled by the "+DIR_RST" signal, but can only assert a true onto the differential SCSI bus because driver enable 208 is grounded and the output is wired so as to logically invert the input signal. Receiver enable 210 is always enabled.

Figure 6A:
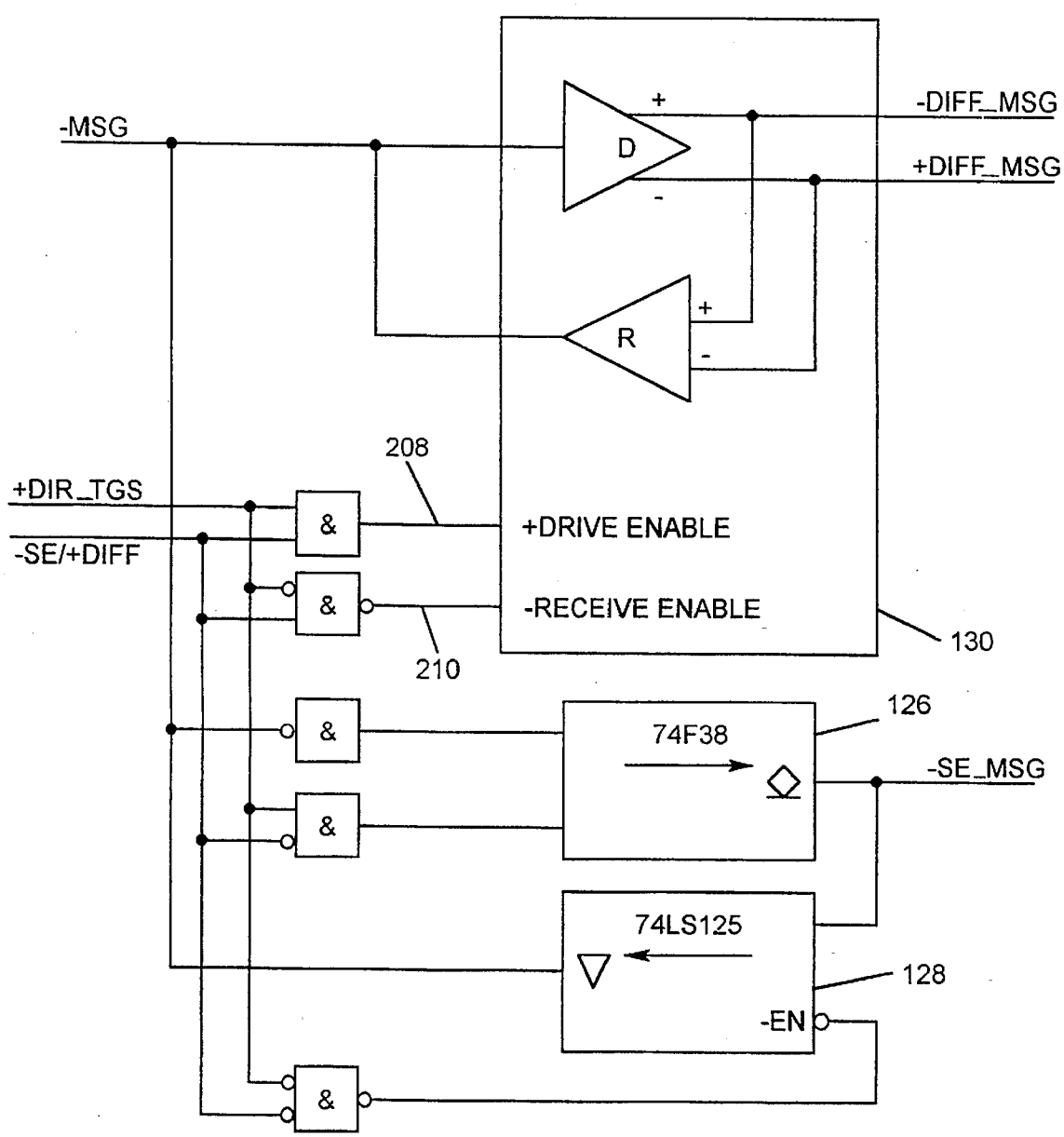
FIGS. 6a and 6b are schematic diagrams of two embodiments of the universal transceiver configuration for the SCSI-3 'P' embodiment of the present invention.
Figure 6B:
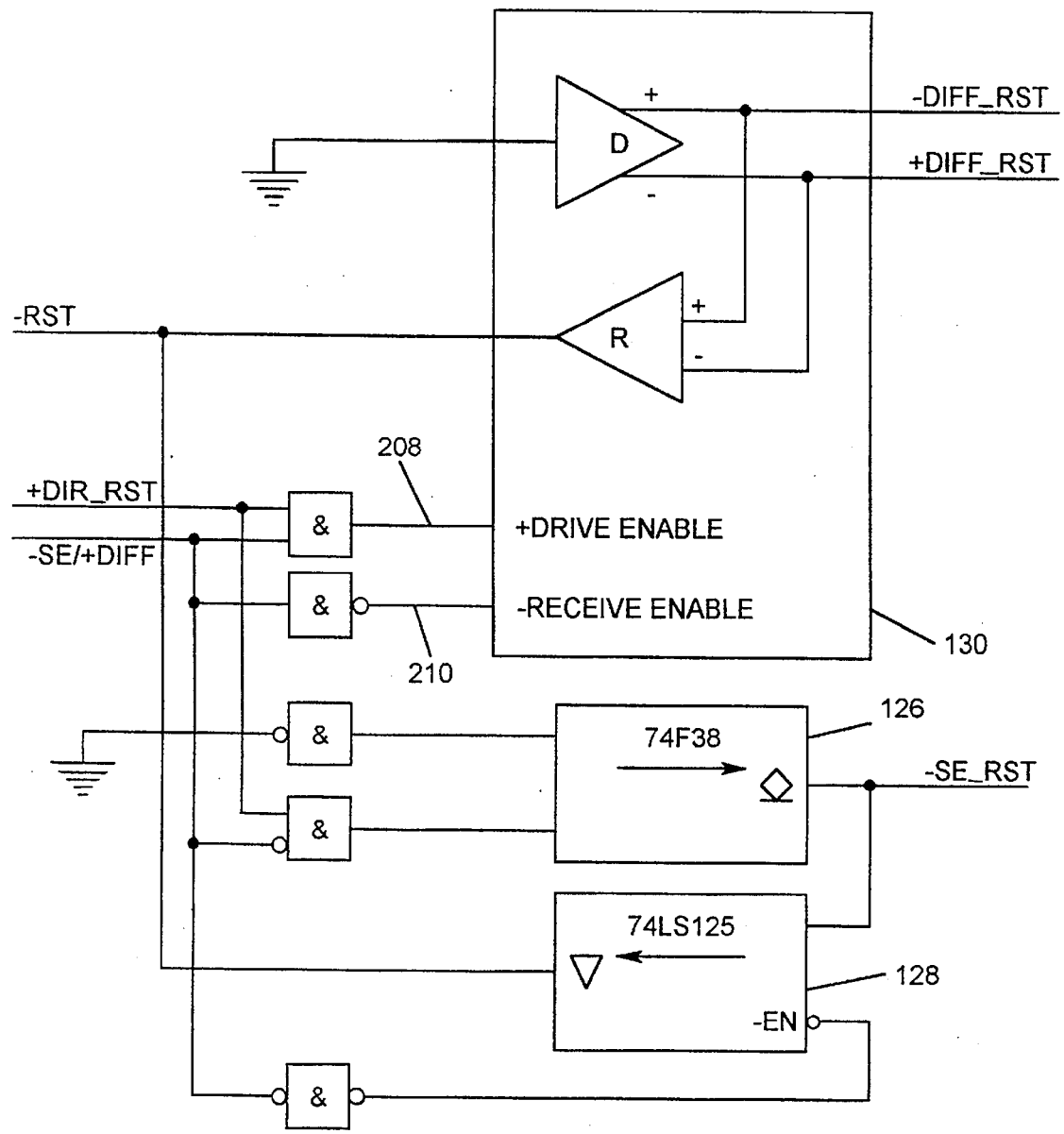

In a preferred embodiment of the present invention, additional circuitry is added to the control lines of a standard SCSI protocol controller chip to implement the design of universal electrical interface system 120. FIGS. 6a and 6b show the implementation of the additional circuitry that is part of control mechanism 136 for normal and OR-tied signals on the SCSI bus, respectively. In each of these examples, the single-ended versus differential operation of universal transceiver 120 is determined by the "–SE/DIFF" signal, which can be driven from a register bit or from the DIFFSENS line as previously described. Differential transceiver 130 of universal transceiver 120 operates in much the same way as that described with respect to FIGS. 5a and 5b, except that both the driver enable signal 208 and receiver enable signal 210 are combined in a logical AND manner with the "–SE/DIFF" signal to specify whether the transceiver 120 is operating in single-ended or differential protocol modes.

For the normal signal embodiment shown in FIG. 6a, single-ended transceiver 124 of universal transceiver 120 is comprised of an open collector driver 74F38 chip as the driver 126 and a tri-state receiver 74LS125 chip as the receiver 128, both of which are available from Texas Instruments, Inc. Driver 126 drives the "–MSG" signal low only if single-ended protocol is specified on the "–SE/DIFF" signal, and MSG is true and "+DSG_TSG" is true. Receiver 128 is enabled only when single-ended protocol is specified on the "–SE/DIFF" signal, and "+DIR_TGS" is false.

A similar embodiment for the OR-tied signals is shown in FIG. 6b. While there are obvious logic simplifications that could be performed for the OR-tied signal embodiment, FIG. 6b is drawn to illustrate the similarities between this circuit and the circuit shown in FIG. 6a. These similarities would allow either the normal or OR-tied embodiment to be included as part of a single universal transceiver part, i.e., one part for each SCSI signal, with one additional control line to select whether that part should operate as an OR-tied signal or not. Alternatively, two separate universal transceiver parts could be produced from the same silicon die, with the differences in the normal and OR-tied embodiments being accounted for in different bond out patterns from the die to the carrier. In another embodiment, multiple parts or even an entire set of such parts could be implemented in the same circuit package or as ASIC logic to form a single universal transceiver chip, for example. Because there are 3 OR-tied signals and 24 remaining signals, one version of this embodiment might put 8 normal universal transceiver circuits and 1 OR-tied circuit into a single chip package, thereby requiring only 3 chip packages to interface to the SCSI-3 'P' cable.

Figure 7:
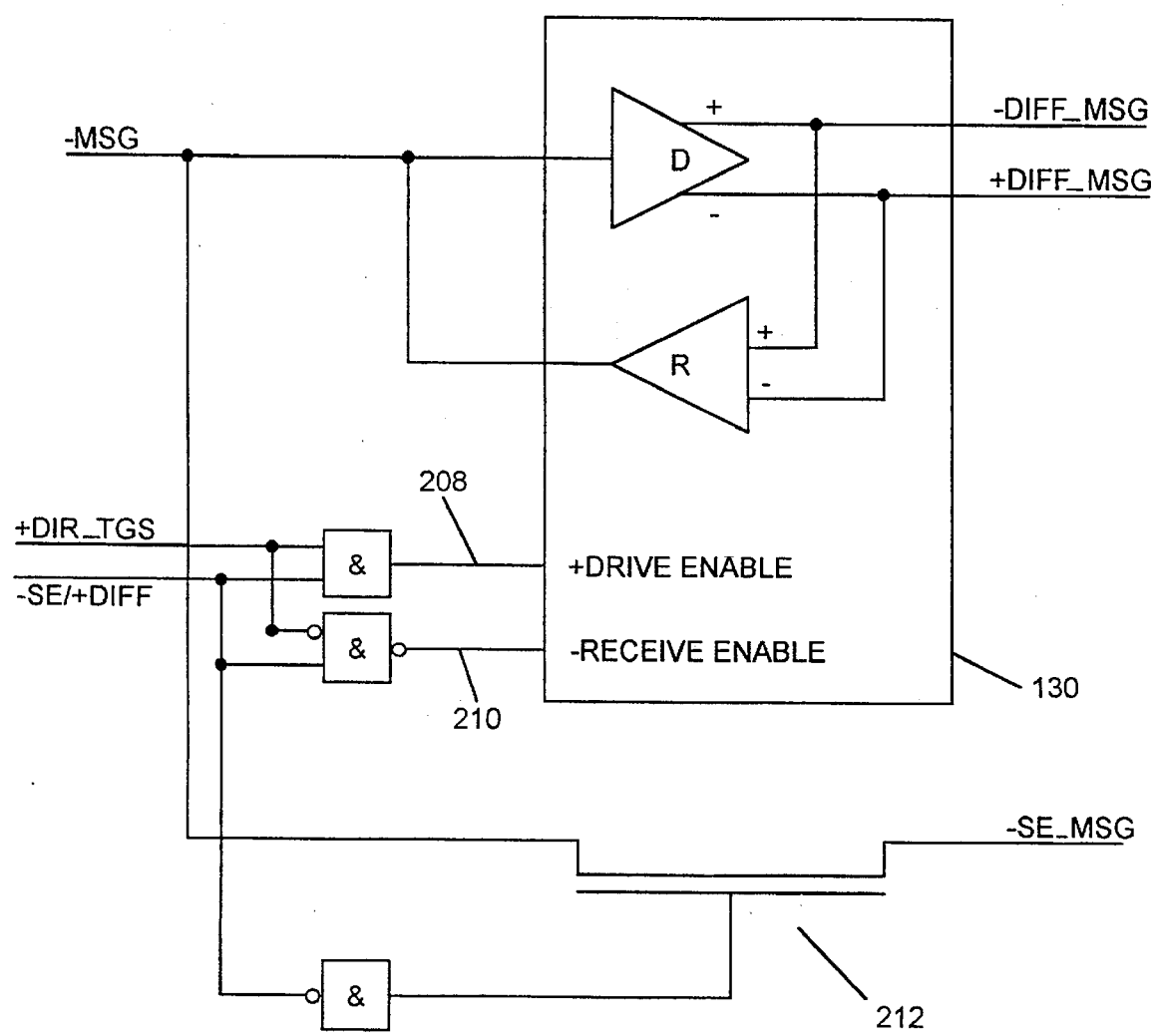
FIG. 7 is a schematic diagram of another embodiment of the universal transceiver configuration for the SCSI-3 'P' embodiment of the present invention.

FIG. 7 illustrates another embodiment of the SCSI-3 'P' universal electrical interface system of the present invention that would be configured as additional circuitry in connection with the standard SCSI controller chip, such as the NCR 53C720 chip. In this embodiment, however, a CMOS switch 212 allows the single-ended transceivers in the SCSI controller chip to be used in place of the single-ended transceiver circuitry 124 as shown in FIG. 6a when the SCSI bus is operating in the single-ended protocol. It will be seen that very little circuitry is required in addition to the normal circuitry for the differential transceivers 130.

Figure 8:
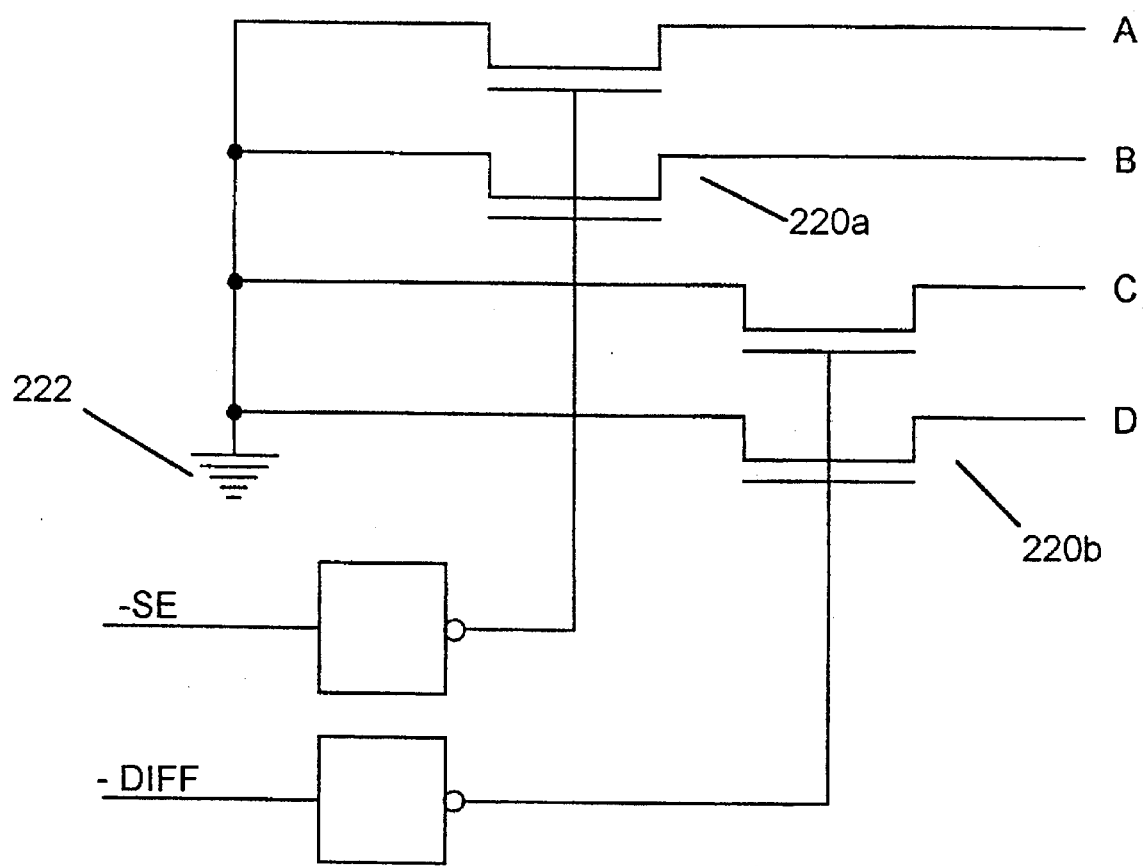
FIG. 8 is a schematic diagram of a switchable ground embodiment of the universal connector of the present invention.

Referring now to FIG. 8, a preferred embodiment for implementing switchable grounds for universal connector and transceiver 120 will be described. In the SCSI-3 'P' cable protocol as shown in FIG. 4, the single-ended and differential busses have differing numbers and locations of grounds on the connector 122. Those ground pins that are common between single-ended and differential can be directly grounded at connector 122; however, the remainder of the ground pins which are not common must be grounded only when the appropriate bus protocol is selected. In FIG. 8, the switchable grounds are implemented using switches 220, such as CMOS 74QST3384 switches available from Quality Semiconductor, Inc., of Santa Clara, Calif. When turned on, switches 220 provide less than 5 Ohms of resistance between input and output, thereby allowing grounds to be electronically applied to the correct connector pins, depending upon whether single-ended or differential protocol is selected, without significantly altering the electrical characteristics of the grounds on the SCSI bus.

In FIG. 8, the two inputs "–SE" and "–DIFF" are easily derived from the "–SE/DIFF" signal described, for example, in FIG. 6a. When "–SE" is low, outputs A and B are connected by switches 220a to a ground 222. The outputs A and B are representative of signals to be grounded in the single-ended protocol, and should be connected to appropriate pins on universal connector 122, such as pins 1 and 2, which are grounded for the single-ended protocol, but not for the differential protocol. Conversely, when "–DIFF" is low, the outputs C and D are connected by switches 220b to ground 222. The outputs C and D are representative of signals to be grounded in the differential protocol, and should be connected to appropriate pins on universal connector 122, such as pins 40 and 64, which are grounded for the differential protocol, but not for the single-ended protocol. In one embodiment, the switches 220 could be made part of a universal transceiver part packages, as described above.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. A universal electrical interface connection system for connecting to and transmitting and receiving electrical signals to and from a Small Computer Systems Interface (SCSI) bus that is configured to define a set of electrical signals according to either a single-ended electrical interface protocol or a differential electrical interface protocol, the connection system comprising:

a set of single-ended transceivers for transmitting and receiving the electrical signals on the SCSI bus according to the single-ended protocol when the set of single-ended transceivers is enabled; and a set of differential transceivers for transmitting and receiving the electrical signals on the SCSI bus according to the differential protocol when the set of differential transceivers is enabled;

control means operably connected to the set of single-ended transceivers and the set of differential transceivers for automatically selecting the appropriate set of transceivers to be enabled depending upon whether the SCSI bus is configured to use the single-ended or the differential protocol, wherein any electrical signals on the SCSI bus which are commonly grounded in both the single-ended and differential protocols are permanently grounded and wherein at least one of the remaining electrical signals on the SCSI bus which is grounded in only one of the single-ended and differential protocols is switchably grounded under control of the control means.

2. A universal electrical interface connection system for connecting to and transmitting and receiving electrical signals to and from a Small Computer Systems Interface (SCSI) bus that is configured to define a set of electrical signals according to either a single-ended electrical interface protocol or a differential electrical interface protocol, the connection system comprising:

at least one set of transceivers for transmitting and receiving the electrical signals on the SCSI bus;

a universal connector that detachably connects to the SCSI bus and is electrically connected to the at least one set of transceivers;

control means for automatically controlling the at least one set of transceivers to utilize the single-ended protocol or the differential protocol to interpret the electrical signals on the SCSI bus depending upon whether the SCSI bus is configured to use the single-ended or the differential protocol, wherein any electrical signals on the SCSI bus which are commonly grounded in both the single-ended and differential protocols are grounded to the universal connector and wherein at least one of the remaining electrical signals on the SCSI bus which is grounded in only one of the single-ended or differential protocols is switchably grounded under control of the control means.

3. An electrical interface to a Small Computer Systems Interface (SCSI) bus that is configured to define a set of electrical signals according to at least a single-ended electrical interface protocol and a differential electrical interface protocol, the electrical interface comprising:

a connector that attaches to the SCSI bus, the connector being electrically grounded to at least one electrical signal on the SCSI bus that is grounded in both the singled-ended protocol and the differential protocol; and control means for automatically determining the appropriate one of the SCSI electrical interface protocols which is being utilized by the SCSI bus to which the connector attached and in response switchably grounding at least one other electrical signal on the SCSI bus which is grounded in only one of the single-ended and differential protocols.

4. A method for providing an electrical interface to a Small Computer Systems Interface (SCSI) bus that is configured to define a set of electrical signals according to at least a single-ended electrical interface protocol and a differential electrical interface protocol, the method comprising the steps of:

(a) providing a connector that attaches to the SCSI bus;

(b) permanently grounding at least one electrical signal in the connector that is grounded in both the singled-ended and differential protocols;

(c) automatically determining the appropriate one of the SCSI electrical interface protocols which is being utilized by the SCSI bus to which the connector attached; and (d) in response to step (c), switchably grounding at least one other electrical signal in the connector which is grounded in only one of the single-ended and differential protocols.

5. A universal electrical interface connection system for connecting to and transmitting and receiving electrical signals to and from a Small Computer Systems Interface (SCSI) bus that is configured to define a set of electrical signals according to either a single-ended electrical interface protocol or a differential electrical interface protocol, the connection system comprising:

a set of single-ended transceivers for transmitting and receiving the electrical signals on the SCSI bus according to the single-ended protocol when the set of single-ended transceivers is enabled; and a set of differential transceivers for transmitting and receiving the electrical signals on the SCSI bus according to the differential protocol when the set of differential transceivers is enabled;

control means operably connected to the set of single-ended transceivers and the set of differential transceivers for automatically selecting the appropriate set of transceivers to be enabled depending upon whether the SCSI bus is configured to use the single-ended or the differential protocol, the control means including:

an enable line connected to each of the set of single-ended transceivers and to each of the set of differential transceivers; and a programmable processor means for setting the enable line to at least a first or a second logical state, the processor means including:

an input register connected to a selected signal from the SCSI bus from which the processor means can determine whether the SCSI bus is configured to use the single-ended protocol or the differential protocol; and an output register for selectively setting the enable line in response to a determination made by the processor means as to whether the SCSI bus is configured to use the single-ended protocol or the differential protocol, such that the enable line selectively enables the set of single-ended transceivers and disables the set of differential transceivers when the enable line is in the first logical state and selectively disables the single-ended transceivers and enables the differential transceivers when the enable line is in the second logical state.

6. A universal electrical interface connection system for connecting to and transmitting and receiving electrical signals to and from a Small Computer Systems Interface (SCSI) bus that is configured to define a set of electrical signals according to either a single-ended electrical interface protocol or a differential electrical interface protocol, the connection system comprising:

at least one set of transceivers for transmitting and receiving the electrical signals on the SCSI bus; and control means for automatically controlling the at least one set of transceivers to utilize the single-ended protocol or the differential protocol to interpret the electrical signals on the SCSI bus depending upon whether the SCSI bus is configured to use the single-ended protocol or the differential protocol, the control means including:

a control line connected to each transceiver of the at least one set of transceivers; and a programmable processor means for setting the control line to at least a first or a second logical state, the processor means including:

an input register connected to a selected signal from the SCSI bus from which the processor means can determine whether the SCSI bus is configured to use the single-ended protocol or the differential protocol; and an output register for selectively setting the control line in response to a determination made by the processor means as to whether the SCSI bus is configured to use the single-ended protocol or the differential protocol.

7. The connection system of claim 6 further comprising:

a single universal electrical connector that detachably connects to the SCSI bus and that is electrically connected to the at least one set of transceivers.

8. The connection system of claim 6 wherein the control signal is an enable line and wherein the at least one set of transceivers includes:

a set of single-ended transceivers for transmitting and receiving the electrical signals on the SCSI bus according to the single-ended protocol when the set of single-ended transceivers is enabled by the enable line; and a set of differential transceivers for transmitting and receiving the electrical signals on the SCSI bus according to the differential protocol when the set of differential transceivers is enabled by the enable line;

such that the enable line selectively enables the set of single-ended transceivers and disables the set of differential transceivers when the enable line is in the first logical state and selectively disables the single-ended transceivers and enables the differential transceivers when the enable line is in the second logical state.

9. A method for connecting to and transmitting and receiving electrical signals to and from a Small Computer Systems Interface (SCSI) bus that is configured to define a set of electrical signals according to either a single-ended electrical interface protocol or a differential electrical interface protocol, the method comprising the steps of:

(a) providing at least one set of transceivers for transmitting and receiving the electrical signals on the SCSI bus; and (b) automatically controlling the at least one set of transceivers to utilize the single-ended protocol or the differential protocol to interpret the electrical signals on the SCSI bus depending upon whether the SCSI bus is configured to use the single-ended protocol or the differential protocol, step (b) comprising the processor-implemented steps of:

(b1) connecting a selected signal from the SCSI bus to an input register from which a processor can determine whether the SCSI bus is configured to use the single-ended protocol or the differential protocol;

(b2) selectively setting a control line to at least a first or a second logical state in response to the determination made by the processor in step (b1), the control line being connected to each of the at least one set of transceivers to determine whether to utilize the single-ended protocol or the differential protocol to interpret the electrical signals on the SCSI bus.

10. A universal electrical interface connection system for connecting to and transmitting and receiving electrical signals to and from a Small Computer Systems Interface (SCSI) bus that is configured to define a set of electrical signals according to either a single-ended electrical interface protocol or a differential electrical interface protocol, the connection system comprising:

a set of single-ended transceivers for transmitting and receiving the electrical signals on the SCSI bus according to the single-ended protocol when the set of single-ended transceivers is enabled; and a set of differential transceivers for transmitting and receiving the electrical signals on the SCSI bus according to the differential protocol when the set of differential transceivers is enabled;

control means operably connected to the set of single-ended transceivers and the set of differential transceivers for automatically selecting the appropriate set of transceivers to be enabled depending upon whether the SCSI bus is configured to use the single-ended or the differential protocol, the control means including:

an enable line connected to each of the set of single-ended transceivers and to each of the set of differential transceivers; and means for setting the enable line to at least a first or a second logical state in response to selected signal such that the enable line selectively enables the set of single-ended transceivers and disables the set of differential transceivers when the enable line is in the first logical state and selectively disables the single-ended transceivers and enables the differential transceivers when the enable line is in the second logical state, wherein the selected signal is the DIFFSENS signal and the DIFFSENS signal is not switched to ground when the connection system is connected to a SCSI bus configured use the single-ended protocol.

11. A universal electrical interface connection system for connecting to and transmitting and receiving electrical signals to and from a Small Computer Systems Interface (SCSI) bus that is configured to define a set of electrical signals according to either a single-ended electrical interface protocol or a differential electrical interface protocol, the connection system comprising:

at least one set of transceivers for transmitting and receiving the electrical signals on the SCSI bus; and control means for automatically controlling the at least one set of transceivers to utilize the single-ended protocol or the differential protocol to interpret the electrical signals on the SCSI bus depending upon whether the SCSI bus is configured to use the single-ended protocol or the differential protocol, the control means including:

a control line connected to each transceiver of the at least one set of transceivers; and means for setting the control line to at least a first or a second logical state in response to a selected signal on the SCSI bus such that the control line determines whether the at least one set of transceivers utilize the single-ended protocol or the differential protocol to interpret the electrical signals on the SCSI bus, wherein the selected signal is the DIFFSENS signal and the DIFFSENS signal is not switched to ground when the connection system is connected to a SCSI bus configured use the single-ended protocol.

12. The connection system of claim 11 further comprising:

a single universal electrical connector that detachably connects to the SCSI bus and that is electrically connected to the at least one set of transceivers.

13. The connection system of claim 11 wherein the control signal is an enable line and wherein the at least one set of transceivers includes:

a set of single-ended transceivers for transmitting and receiving the electrical signals on the SCSI bus according to the single-ended protocol when the set of single-ended transceivers is enabled by the enable line; and a set of differential transceivers for transmitting and receiving the electrical signals on the SCSI bus according to the differential protocol when the set of differential transceivers is enabled by the enable line;

such that the enable line selectively enables the set of single-ended transceivers and disables the set of differential transceivers when the enable line is in the first logical state and selectively disables the single-ended transceivers and enables the differential transceivers when the enable line is in the second logical state.

14. A method for connecting to and transmitting and receiving electrical signals to and from a Small Computer Systems Interface (SCSI) bus that is configured to define a set of electrical signals according to either a single-ended electrical interface protocol or a differential electrical interface protocol, the method comprising the steps of:

(a) providing at least one set of transceivers for transmitting and receiving the electrical signals on the SCSI bus; and (b) automatically controlling the at least one set of transceivers to utilize the single-ended protocol or the differential protocol to interpret the electrical signals on the SCSI bus depending upon whether the SCSI bus is configured to use the single-ended protocol or the differential protocol as indicated by a DIFFSENS signal; and (c) not switching the DIFFSENS signal to ground when the SCSI bus configured use the single-ended protocol.

* * * * *